(12) United States Patent
Iwakiri (10) Patent No.: US 12,085,089 B2
(45) Date of Patent: Sep. 10, 2024

(54) CENTRIFUGAL COMPRESSOR IMPELLER AND CENTRIFUGAL COMPRESSOR

(71) Applicant: MITSUBISHI HEAVY INDUSTRIES ENGINE & TURBOCHARGER, LTD., Sagamihara (JP)

(72) Inventor: Kenichiro Iwakiri, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 71 days.

(21) Appl. No.: 17/925,120

(22) PCT Filed: May 20, 2020

(86) PCT No.: PCT/JP2020/019964
§ 371 (c)(1),
(2) Date: Nov. 14, 2022

(87) PCT Pub. No.: WO2021/234863
PCT Pub. Date: Nov. 25, 2021

(65) Prior Publication Data
US 2023/0184258 A1    Jun. 15, 2023

(51) Int. Cl.
*F04D 29/28* (2006.01)
*F04D 29/30* (2006.01)
*F04D 29/66* (2006.01)

(52) U.S. Cl.
CPC .......... *F04D 29/284* (2013.01); *F04D 29/30* (2013.01); *F04D 29/66* (2013.01); *F05D 2220/40* (2013.01); *F05D 2240/303* (2013.01)

(58) Field of Classification Search
CPC .............................. F04D 29/284; F04D 29/30
See application file for complete search history.

(56) References Cited

U.S. PATENT DOCUMENTS 9,033,667 B2 *  5/2015  Iwakiri ................... F04D 29/30
                                                        416/183
9,689,263 B2 *  6/2017  Gharaibah .......... F04D 27/0292
(Continued)

FOREIGN PATENT DOCUMENTS

JP    2004-44473 A    2/2004
JP    2008-196381 A   8/2008
(Continued)

OTHER PUBLICATIONS

International Preliminary Report on Patentability and Written Opinion of the International Searching Authority for International Application No. PCT/JP2020/019964, dated Dec. 1, 2022, with an English translation.
(Continued)

*Primary Examiner* — Sabbir Hasan
(74) *Attorney, Agent, or Firm* — Birch, Stewart, Kolasch & Birch, LLP (57) ABSTRACT

An impeller of a centrifugal compressor according to the present disclosure includes: a hub; a plurality of full blades disposed on a peripheral surface of the hub at intervals in a circumferential direction; and a plurality of splitter blades each of which is disposed between adjacent full blades of the plurality of full blades on the peripheral surface of the hub. When a blade height ratio which is a ratio of a blade height (Hf) of each full blade to a blade height (Hs) of each splitter blade on a meridional plane of the impeller is defined as Hs/Hf, the blade height ratio satisfies Hs/Hf<1 at least at a leading edge of each splitter blade.

12 Claims, 9 Drawing Sheets

(56) References Cited

U.S. PATENT DOCUMENTS

| | | | |
|---|---|---|---|
| 11,028,856 B2* | 6/2021 | Kiriaki | .................. F04D 29/666 |
| 11,473,429 B2* | 10/2022 | Akimoto | .................. F01D 5/141 |
| 2007/0134086 A1 | 6/2007 | Higashimori et al. | |
| 2012/0189454 A1 | 7/2012 | Iwakiri et al. | |

FOREIGN PATENT DOCUMENTS

| | | |
|---|---|---|
| JP | 2011-80411 A | 4/2011 |
| JP | 2017-44190 A | 3/2017 |
| WO | WO 2005/054681 A1 | 6/2005 |

OTHER PUBLICATIONS

International Search Report for International Application No. PCT/JP2020/019964, dated Jul. 7, 2020.
Li et al., "Efficient Design Method for Applying Vortex Generators in Turbomachinery", Journal of Turbomachinery, vol. 141, Aug. 2019, pp. 1-12.

* cited by examiner

CENTRIFUGAL COMPRESSOR IMPELLER AND CENTRIFUGAL COMPRESSOR

TECHNICAL FIELD

The present disclosure relates to a centrifugal compressor impeller and a centrifugal compressor.

BACKGROUND

Conventionally, as a technique to improve the output of engines such as automobile engines and marine engines, turbochargers (superchargers) are widely used to compress intake air sucked by the engines and supply the oxygen-rich intake air with increased density to the engines.

A turbocharger includes, for example, a rotational shaft, a centrifugal compressor (compressor) provided at one end of the rotational shaft, and a turbine provided at the other end of the rotational shaft, and is configured to rotate an impeller (turbine wheel) of the turbine by energy of exhaust gas from an engine, rotate the rotational shaft and thus an impeller (compressor wheel) of the centrifugal compressor about the axis with the rotation of the turbine impeller to compress the intake air, and supply it to the engine.

The impeller of the centrifugal compressor includes a substantially truncated conical hub (compressor hub) coaxially connected to the rotational shaft, and a plurality of rotor blades (compressor rotor blades) arranged at predetermined intervals in the circumferential direction about the axis and extending from the outer peripheral surface of the hub outward substantially in the radial direction.

Here, if the plurality of rotor blades have the same shape and size, the difference in flow velocity of fluid (compressed air, etc.) between the pressure side and the suction side of each rotor blade becomes very large, which may result in poor impeller efficiency.

For this reason, conventionally, the impeller of this type often includes not only a plurality of full blades (long blades) arranged at predetermined intervals in the circumferential direction, but also splitter blades (short blades, intermediate blades) arranged between each two adjacent full blades in the circumferential direction as the rotor blades to improve the impeller efficiency.

However, the flow velocity of incoming flow between adjacent full blades may vary, for example, between opposite sides of each splitter blade, i.e., between the pressure side and the suction side of the full blades, with higher flow velocity on the suction side. As a result, even if splitter blades are provided so that the cross-sectional areas of flow passages (paths) on opposite sides of each splitter blade are geometrically equal, the flow rate is higher on the suction side than on the pressure side due to the higher flow velocity, causing non-uniform flow rate between the passages and inability to evenly distribute the fluid. The non-uniform flow rate between the passages and the inability to evenly distribute the fluid may cause uneven blade loading, which increases the energy loss of the compressed air flowing through the passages and prevents the desired improvement in impeller efficiency from being achieved.

For this reason, much research has been conducted on the shape, number, and arrangement of full blades and splitter blades to improve the impeller efficiency.

For example, Patent Document 1 discloses a centrifugal compressor impeller in which the leading edge blade angle $\theta$ of the splitter blade at the inlet end varies in the height direction from the hub surface, the tip portion is inclined toward the suction side of the full blade with an inclination angle larger than that of the other portions, and the hub surface side portion is inclined toward the pressure side of the full blade with an inclination angle larger than that of the other portions.

In this centrifugal compressor impeller, by configuring the splitter blade as described above, the splitter blade is adapted to a complex internal flow of the centrifugal compressor, i.e., the interference between the leading edge of the splitter blade and the leakage flow over the tip end of the full blade (through the tip gap) is suppressed, resulting in uniform flow distribution, high pressure ratio, and high efficiency (i.e., further improvement in impeller efficiency).

Patent Document 2 discloses an impeller that includes a protrusion protruding from the outer peripheral surface of the hub between adjacent full blade and splitter blade (first splitter blade) and extending along the flow direction of a fluid flowing radially outward between the adjacent full blade and splitter blade.

In this impeller, the protrusion functions as a second splitter blade to prevent the fluid flowing between the protrusion and the full blade or between the protrusion and the splitter blade from side slipping. This allows the impeller to exert a stronger radially outward force on the fluid, resulting in uniform flow distribution, high pressure ratio, and high efficiency.

CITATION LIST

Patent Literature

Patent Document 1: JP2011-80411A
Patent Document 2: JP2017-44190A

SUMMARY

Problems to be Solved

Figure 8:
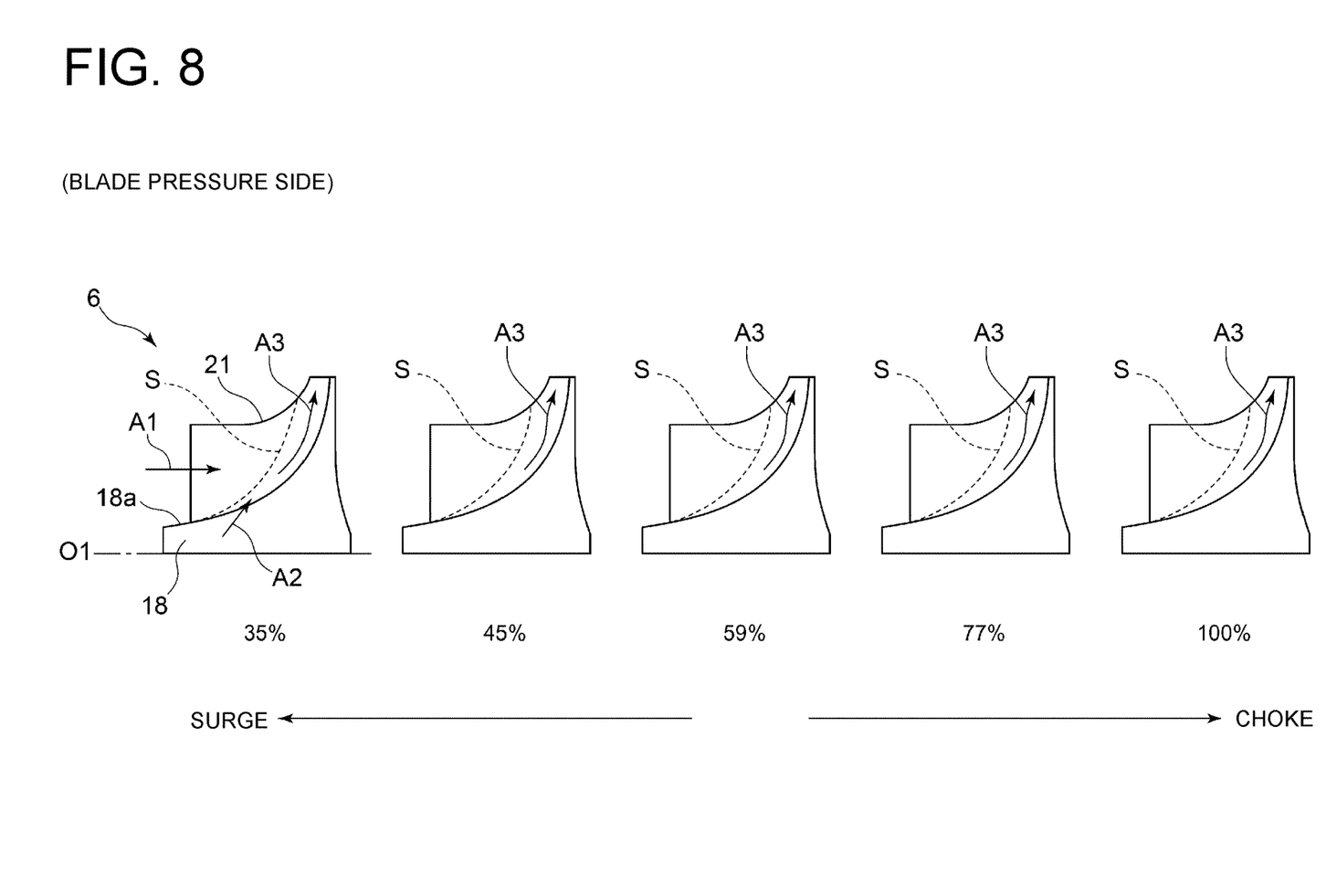
FIG. 8 is a diagram showing the position (separation line) where the fluid flowing between the rotor blades of the centrifugal compressor impeller separates from the blade surface.

On the other hand, the present inventors have conducted diligent research and found that, as shown in FIG. 8, the flow A2 entering the axis side (inner side, hub 18 side) of the impeller 6 is gradually directed outward by centrifugal force and tilted little by little with respect to the direction of the axis O1, and along the peripheral surface 18a of the hub 18, runs up the wall surface (blade surface) of the rotor blade 21 from the base end of the rotor blade 21. The flow A2 running up the wall surface of the rotor blade 21 collides with the main flow A1 entering in the direction of the axis O1 from the inlet side of the impeller 6 to generate a secondary flow A3 that separates from the wall surface of the rotor blade 21 and flows to the outlet side of the impeller 6.

Further, the present inventors have found the following new findings: the position (separation line S) where the separation occurs and the secondary flow A3 is generated remains almost unchanged from the surge (low flow rate) side to the choke (maximum flow) side on the pressure side of the rotor blade 21; this trend is slightly more pronounced on the surge side with higher pressure ratio; and the similar trend is observed on the suction side of the rotor blade 21, and have discovered that the secondary flow A3 caused by these separations greatly affects the reduction in impeller efficiency.

Therefore, on the basis of such research results, development of a technique for suppressing the generation of the secondary flow has been strongly desired.

In view of the above circumstances, an object of the present disclosure is to provide a centrifugal compressor impeller and a centrifugal compressor whereby it is possible to suppress the generation of the secondary flow, achieve uniform flow distribution, high pressure ratio, and high efficiency compared to conventional ones more efficiently and effectively, and further improve the impeller efficiency.

Solution to the Problems

A centrifugal compressor impeller according to an aspect of the present disclosure includes: a hub; a plurality of full blades disposed on a peripheral surface of the hub at intervals in a circumferential direction; and a plurality of splitter blades each of which is disposed between adjacent full blades of the plurality of full blades on the peripheral surface of the hub. When a blade height ratio which is a ratio of a blade height (Hf) of each full blade to a blade height (Hs) of each splitter blade on a meridional plane of the impeller is defined as Hs/Hf, the blade height ratio satisfies Hs/Hf<1 at least at a leading edge of each splitter blade.

Further, a centrifugal compressor according to an aspect of the present disclosure is provided with the above-described centrifugal compressor impeller.

Advantageous Effects

With the centrifugal compressor impeller and the centrifugal compressor according to an aspect of the present disclosure, it is possible to suppress the generation of the secondary flow, achieve uniform flow distribution, high pressure ratio, and high efficiency compared to conventional ones more efficiently and effectively, and further improve the impeller efficiency.

DETAILED DESCRIPTION

First Embodiment

Hereinafter, the centrifugal compressor impeller and the centrifugal compressor according to the first embodiment will be described with reference to FIGS. 1 to 5, 8, and 9.

In the present embodiment, the centrifugal compressor of the present disclosure is described as being provided in a turbocharger, but the centrifugal compressor of the present disclosure may be, for example, an electric centrifugal compressor, and the fluid to be compressed need not be limited to air. That is, the centrifugal compressor (and the centrifugal compressor impeller) of the present disclosure may be any centrifugal compressor capable of compressing and feeding a fluid, and may be configured by a centrifugal compressor alone or in combination with a mechanism or device other than a turbine. Further, there is no need to limit the use or the like.

Turbocharger

Figure 1:
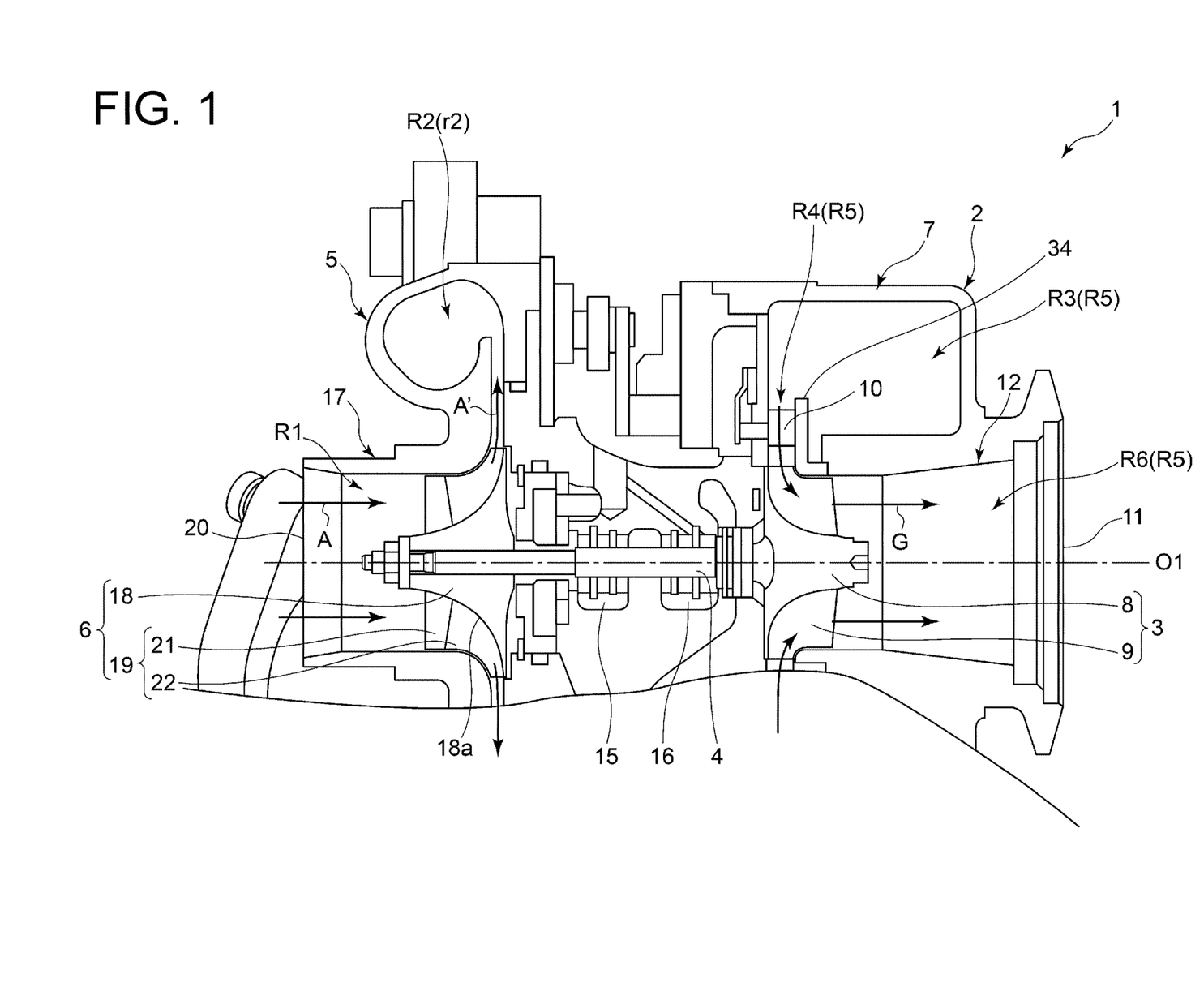
FIG. 1 is a diagram showing an example of a turbocharger equipped with the centrifugal compressor according to first and second embodiments of the present disclosure.

For example, as shown in FIG. 1, a turbocharger 1 according to the present embodiment is configured to rotate an impeller 3 (turbine wheel) of a turbine 2 by energy of exhaust gas G from an engine such as an automobile engine or a marine engine about the axis (rotational axis) O1, rotate a rotational shaft 4 coaxially connected to the impeller 3, thus rotate an impeller (compressor wheel) 6 of a centrifugal compressor (compressor) 5 coaxially connected to the rotational shaft 4 to suck and compress the air (intake air, fluid) A by the impeller 6, and supply the compressed air A' to the engine.

Turbine

The turbine 2 includes an impeller 3 coaxially connected to the other end side of the rotational shaft 4, and a turbine cover (turbine housing) 7 accommodating the impeller 3.

The impeller 3 includes a substantially truncated conical turbine hub 8 coaxially connected to the rotational shaft 4, and a plurality of turbine rotor blades 9 extending from the outer peripheral surface of the turbine hub 8 outward in the radial direction around the axis O1.

On the outer side of the impeller 3 of the turbine 2 in the radial direction around the axis O1, an exhaust gas passage R5 composed of a scroll passage R3 disposed around the impeller 3 for supplying the exhaust gas G discharged from the engine to the impeller 3 and a nozzle passage R4 provided with an exhaust gas flow rate adjustment device such as nozzle vanes 10 is provided.

Further, on the rear side of the impeller 3 in the direction of the axis O1 (on the discharge port 11 side for the exhaust gas G), a discharge passage R6 (exhaust gas passage R5) is provided coaxially with the impeller 3 for receiving the exhaust gas G from the outlet of the turbine rotor blades 9 of the impeller 3 and discharging it to the outside. The discharge passage R6 is composed of an exhaust diffuser 12.

In the turbocharger 1 according to this embodiment, the scroll passage R3, the nozzle passage R4, and the discharge passage R6 (exhaust diffuser 12) are formed by the turbine cover 7 accommodating the impeller 3.

Centrifugal compressor: Compressor

The centrifugal compressor 5 according to the present embodiment includes an impeller (compressor wheel) 6 of the centrifugal compressor 5 coaxially connected to one end side of the rotational shaft 4 rotatably supported by bearing stands 15, 16, and a compressor cover 17 accommodating the impeller 6.

The impeller 6 of the centrifugal compressor 5 includes a substantially truncated conical compressor hub (hub) 18 coaxially connected to the rotational shaft 4, and a plurality of compressor rotor blades (impeller rotor blades) 19 extending from the outer peripheral surface of the compressor hub 18 outward in the radial direction around the axis O1.

On the front side of the impeller 6 in the direction of the axis O1 (on the intake port 20 side for the air A), an intake passage R1 is provided for sucking the air A with the rotation of the impeller 6 and supplying it to the impeller 6.

Further, on the outer side of the impeller 6 in the radial direction around the axis O1, a compressed air passage (compressed gas passage) R2 having a scroll r2 is provided for receiving the compressed air A' discharged from the impeller 6 and supplying it to the engine.

In the turbocharger 1 according to the present embodiment having the above configuration, the exhaust gas G discharged from the engine is supplied from the radially outer side of the impeller 3 of the turbine 2 through the scroll passage R3 and the nozzle passage R4 of the turbine 2, and the energy of the exhaust gas G drives the impeller 3 to rotate. The rotation of the impeller 3 drives the rotational shaft 4 and the impeller 6 of the centrifugal compressor 5 to rotate.

With the rotation of the impeller 6, the air A is sucked from the intake port 20, flows through the intake passage R1, and is supplied to the impeller 6 while being compressed. The compressed air A' is then supplied to the engine through the compressed air passage R2. The exhaust gas G that has driven the impeller 3 of the turbine 2 flows through the discharge passage R6 of the exhaust diffuser 12, recovers the pressure, and is discharged to the outside.

Impeller of Centrifugal Compressor

Figure 2:
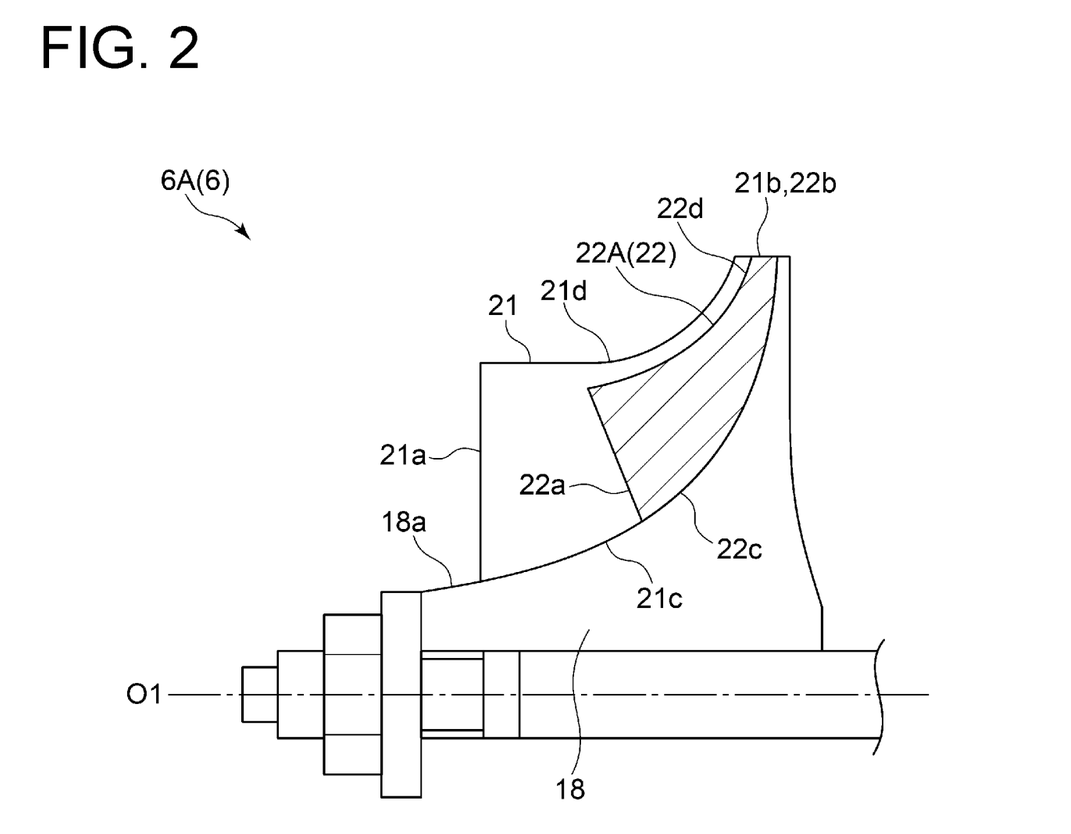
FIG. 2 is a partial cross-sectional view showing an example of the centrifugal compressor and the centrifugal compressor impeller according to the first embodiment of the present disclosure.

The impeller 6 of the centrifugal compressor 5 according to the present embodiment includes a hub 18, a plurality of full blades 21 disposed on the peripheral surface 18a of the hub 18 at intervals in the circumferential direction around the axis (shaft) O1, and a plurality of splitter blades 22 each of which is disposed between adjacent full blades 21 of the plurality of full blades 21 on the peripheral surface 18a of the hub 18.

Here, as described above (FIG. 8), the present inventors have conducted diligent research and found that the flow A2 entering the axis (O1, rotational shaft 4) side of the impeller 6 of the centrifugal compressor 5 is gradually directed outward by centrifugal force and tilted little by little with respect to the direction of the axis O1, and along the peripheral surface 18a of the hub 18, runs up the blade surface (wall surface) of the rotor blade 21 from the hub side (base end side) of the rotor blade (21). The flow A2 collides with the main flow A1 entering from the inlet side of the impeller 6 to generate a secondary flow A3 that separates from the blade surface of the rotor blade (21) and flows to the outlet side.

Further, the present inventors have found the following new findings: the separation line (boundary position) S where the separation occurs and the secondary flow A3 is generated remains almost unchanged from the surge side to the choke side on the pressure side of the rotor blade (21); this trend is slightly more pronounced on the surge side with higher pressure ratio; and the similar trend is observed on the suction side of the rotor blade (21), and have discovered that the secondary flow A3 caused by these separations greatly affects the reduction in impeller efficiency.

Figure 9:
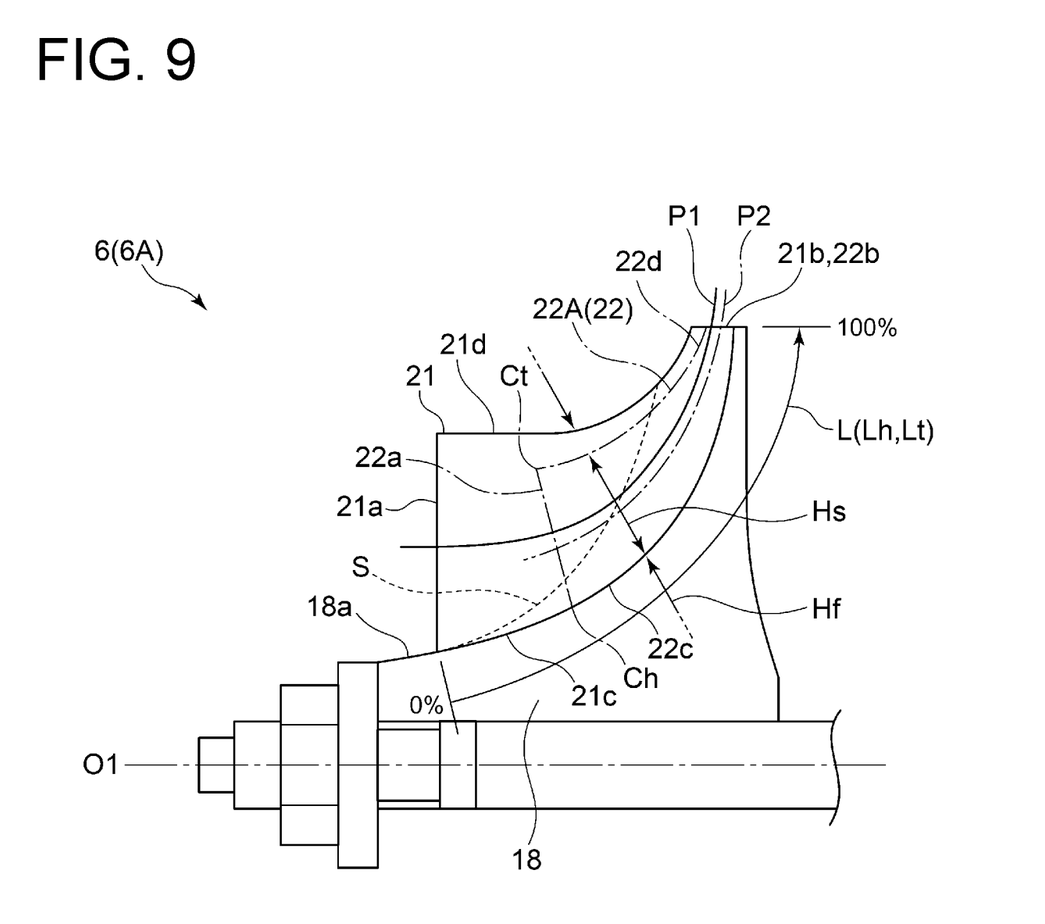
FIG. 9 is a partial cross-sectional view showing an example of the centrifugal compressor and the centrifugal compressor impeller according to the first (second) embodiment of the present disclosure and shows the blade height, chord length, etc.

Further, it has been found that, in a meridional plane (meridional plane cross-section) of the impeller 6 shown in FIGS. 8 and 9, when the chord position along the chord length L at the leading edge 21a of the full blade 21 is defined as 0%, and the chord position at the trailing edge 21b of the full blade 21 is defined as 100%, the separation line S, where the separation occurs and the secondary flow A3 is generated, is formed in a concavely curved shape (concave arc shape) in which the line gradually extends from the base end 21c on the leading edge 21a side (approximately 0% to 5% position) of the full blade 21 to the tip end 21d side on the trailing edge 21b side of the full blade 21, and reaches the tip end 21d at approximately the 70% position.

Additionally, it has been confirmed that the impeller efficiency is reduced by interference with the leakage flow leaking through a gap on the tip end 21d side (tip side) of the full blade 21, especially, interference with the leakage flow leaking through a gap on the leading edge 21a side of the full blade 21.

On the basis of the above-described remarkable results and findings by the present inventors, as shown in FIG. 2 (see FIG. 9), the impeller 6A (6) of the centrifugal compressor 5 according to the present embodiment is configured such that, when a blade height ratio which is a ratio of a blade height (Hf) of the full blade 21 to a blade height (Hs) of the splitter blade 22A on the meridional plane (meridional plane cross-section) of the impeller 6 is defined as Hs/Hf, the blade height ratio satisfies Hs/Hf<1 at least at the leading edge 22a of the splitter blade 22A.

The meridional plane of the impeller 6 in the present disclosure refers to a flow passage cross-section of the impeller 6 of the centrifugal compressor 5 cut along the central axis (O1) and superimposed on a projection of the rotor blade rotated along the central axis (O1), not a cross-section of the rotor blade 19 (full blade 21, splitter blade 22) as it is.

The blade height Hf of the full blade 21 and the blade height Hs of the splitter blade 22A (22) in the present disclosure are each a length dimension from the base end 21c, 22c to the tip end 21d, 22d in the direction perpendicular to the center line P1, P2 between the base end 21c, 22c and the tip end 21d, 22d, in the meridional plane of the impeller 6.

Further, the blade height ratio Hs/Hf, which is the ratio of the blade height (Hf) of the full blade 21 to the blade height (Hs) of the splitter blade 22A, is the blade height ratio at the same chord position.

In the impeller 6A of the centrifugal compressor 5 according to the present embodiment, since the splitter blade 22A is configured such that the blade height ratio satisfies Hs/Hf<1 at least at the leading edge 22a, the splitter blade 22A with a smaller blade height than the full blade 21 blocks the flow A2 along the peripheral surface 18a of the hub 18 toward the blade surface (wall surface) of the full blade 21. Thus, it is possible to suppress the generation of the flow A2 running up the blade surface of the full blade 21 and thus the generation of the secondary flow A3 by the splitter blade 22A.

Further, when the blade height ratio satisfies Hs/Hf<1 at least at the leading edge 22a of the splitter blade 22A, it is possible to effectively suppress interference with the leakage flow leaking through the gap on the tip end 22d side of the full blade 21.

Thus, with the impeller 6A of the centrifugal compressor 5 and the centrifugal compressor 5 including the same according to the present embodiment, it is possible to suppress the generation of the secondary flow and suppress interference with the leakage flow, achieve uniform flow distribution, high pressure ratio, and high efficiency compared to conventional ones more efficiently and effectively, and further improve the impeller efficiency.

Here, the impeller 6A of the centrifugal compressor 5 (and the centrifugal compressor 5 including the same) according to the present embodiment is preferably configured such that the blade height ratio satisfies Hs/Hf<1 in the entire section from the leading edge 22a to the trailing edge 22b of the splitter blade 22A, i.e., at all chord positions from the leading edge 22a to the trailing edge 22b of the splitter blade 22A.

With this configuration, it is possible to suppress interference with the leakage flow by the splitter blade 22A with a smaller blade height than the full blade 21, and suppress the generation of the flow A2 running up the blade surface of the full blade 21 and thus the generation of the secondary flow A3 by the splitter blade 22A.

Further, the impeller 6A of the centrifugal compressor 5 according to the present embodiment is preferably configured such that the blade height ratio satisfies Hs/Hf<0.7 at least at the leading edge 22a of the splitter blade 22A.

With this configuration, it is possible to suppress interference with the leakage flow leaking through the gap on the tip end 22d side of the full blade 21A while suppressing the generation of the secondary flow A3 more effectively.

Further, the impeller 6A of the centrifugal compressor 5 according to the present embodiment is preferably configured such that the blade height ratio satisfies Hs/Hf≤0.7 in the entire section from the leading edge 22a to the trailing edge 22b of the splitter blade 22A.

With this configuration, it is possible to suppress the generation of the secondary flow A3 and suppress interference with the leakage flow leaking through the gap on the tip end 21d side of the full blade 21 more effectively.

Figure 3:
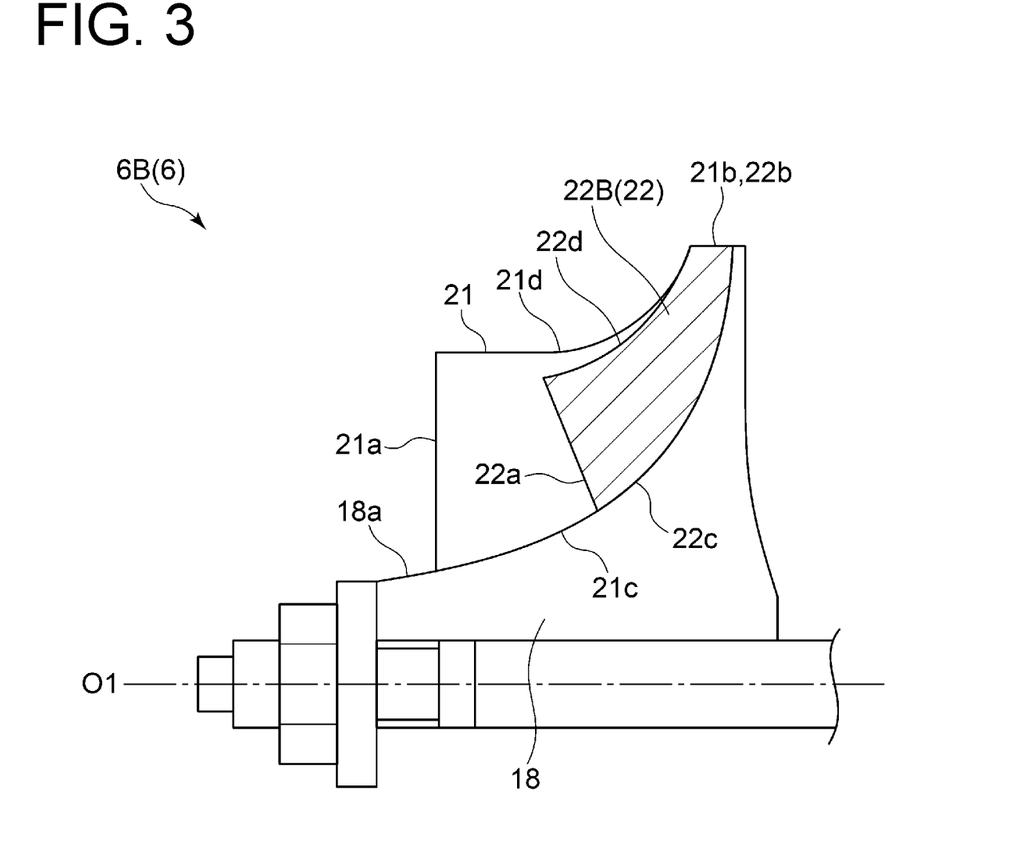
FIG. 3 is a partial cross-sectional view showing a modified example of the centrifugal compressor and the centrifugal compressor impeller according to the first embodiment of the present disclosure.

Further, as shown in FIG. 3 (see FIGS. 8 and 9), the impeller 6B (6) of the centrifugal compressor 5 according to the present embodiment may be configured such that the blade height ratio Hs/Hf gradually increases from the leading edge 22a to the trailing edge 22b of the splitter blade 22B (22C, 22D (22)).

With this configuration, for example, by forming the splitter blade 22B (22) in accordance with the separation line S, it is possible to suppress the generation of the secondary flow A3 and suppress interference with the leakage flow leaking through the gap on the tip end 22d side of the full blade 21 more effectively and efficiently.

Figure 4:
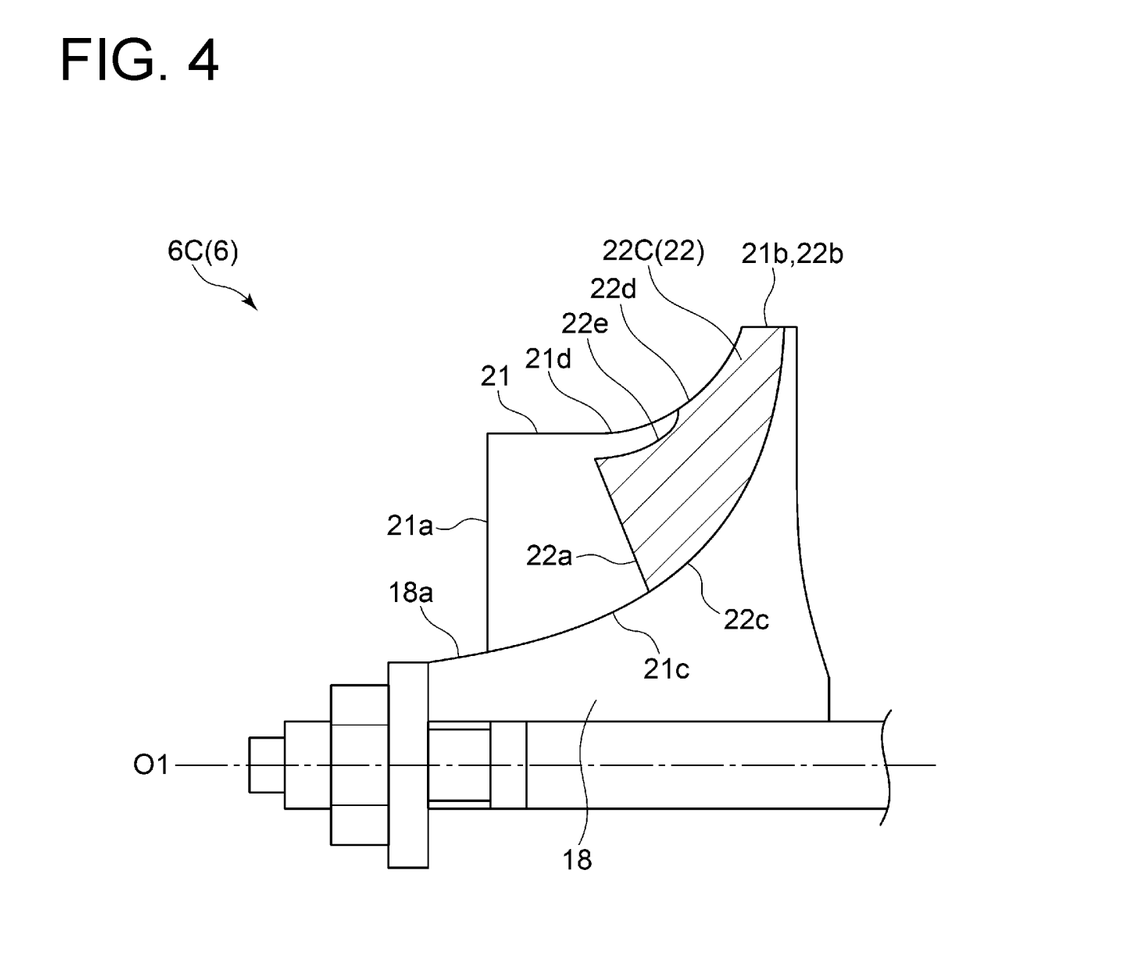
FIG. 4 is a partial cross-sectional view showing a modified example of the centrifugal compressor and the centrifugal compressor impeller according to the first embodiment of the present disclosure.

Further, on the basis of findings obtained as a result of diligent research by the present inventors, as described above, the impeller 6 (6A, 6B, 6C) of the centrifugal compressor 5 according to the present embodiment is preferably configured such that, with respect to the chord position along the chord (chord length L) direction of the full blade 21 on the meridional plane of the impeller 6, when the chord position at the leading edge 21a of the full blade 21 is defined as 0%, the chord position at the trailing edge 21b of the full blade 21 is defined as 100%, the chord position at the base end 22c of the leading edge 22a of the splitter blade 22 (22A, 22B, 22C) is defined as Ch, and the chord position at the tip end 22d of the leading edge 22a of the splitter blade 22 is defined as Ct, Ch≤30% and Ct≥50% are satisfied, as shown in FIGS. 2, 3, and 4 (see FIGS. 8 and 9).

With this configuration, the splitter blade 22 can be formed in accordance with the position of the separation line S where the secondary flow A3 may be generated, so that it is possible to suppress the generation of the secondary flow A3 and suppress interference with the leakage flow leaking through the gap on the tip end 21d side of the full blade 21 effectively and efficiently.

Figure 5:
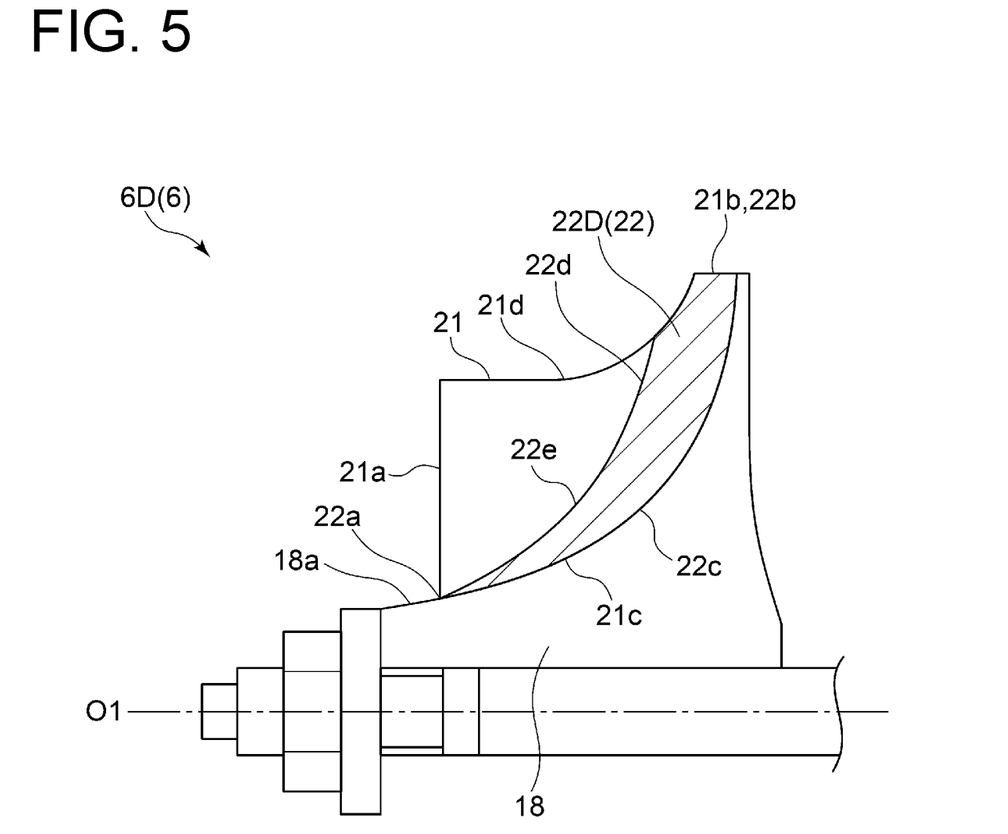
FIG. 5 is a partial cross-sectional view showing a modified example of the centrifugal compressor and the centrifugal compressor impeller according to the first embodiment of the present disclosure.

Further, as shown in FIGS. 4 and 5 (see FIGS. 8 and 9), the impeller 6 (6C, 6D) of the centrifugal compressor 5 according to the present embodiment may be configured such that, when a chord length L at the base end 22c of the splitter blade 22 (22C, 22D) is defined as Lh, and a chord length L at the tip end 22d of the splitter blade 22 is defined as Lt, 2×Lt≤Lh is satisfied. In other words, the blade may have a leading edge shape such that the hub-side chord length Lh is twice or more the tip-side chord length Lt.

In this case, similarly, on the basis of findings obtained as a result of diligent research by the present inventors, the splitter blade 22 can be formed in accordance with the position of the separation line S where the secondary flow A3 may be generated, so that it is possible to suppress the generation of the secondary flow A3 and suppress interference with the leakage flow leaking through the gap on the tip end 22d side of the full blade 21 effectively and efficiently.

Further, as shown in FIGS. 4 and 5 (see FIGS. 8 and 9), the leading edge 22a of the splitter blade 22 (22C, 22D) may have a concave curved portion 22e that is concave with respect to a straight line connecting the base end 22c and the tip end 22d of the leading edge 22a on the meridional plane.

In this case, on the basis of findings obtained as a result of diligent research by the present inventors, the splitter blade 22 can be formed in accordance with the concavely curved separation line S where the secondary flow A3 may be generated, so that it is possible to suppress the generation of the secondary flow A3 and suppress interference with the leakage flow leaking through the gap on the tip end 21d side of the full blade 21 more effectively and efficiently.

Further, as shown in FIGS. 4 and 5 (see FIGS. 8 and 9), the chord position Ch at the base end 22c of the leading edge 22a of the splitter blade 22 (22D) may be set to satisfy Ch=0%. In other words, the leading edge 22a of the splitter blade 22 on the hub side may extend to the leading edge 21a of the full blade 21 so that their leading edges are aligned in the same position (including substantially the same position).

In this case, it is possible to block the flow along the peripheral surface 18a of the hub 18 toward the blade surface of the full blade 21 and suppress the generation of the secondary flow A3 by the splitter blade 22 still more effectively.

Second Embodiment

Next, the centrifugal compressor impeller and the centrifugal compressor according to the second embodiment will be described with reference to FIGS. 6 and 7 (FIGS. 1 to 5, 8, and 9).

In the present embodiment, as in the first embodiment, the centrifugal compressor 5 is assumed to be provided in the turbocharger 1. This embodiment differs from the first embodiment only in the configuration of the impeller 6 of the centrifugal compressor 5. Therefore, in the present embodiment, the same configurations as those in the first

Impeller of Centrifugal Compressor

Figure 6:
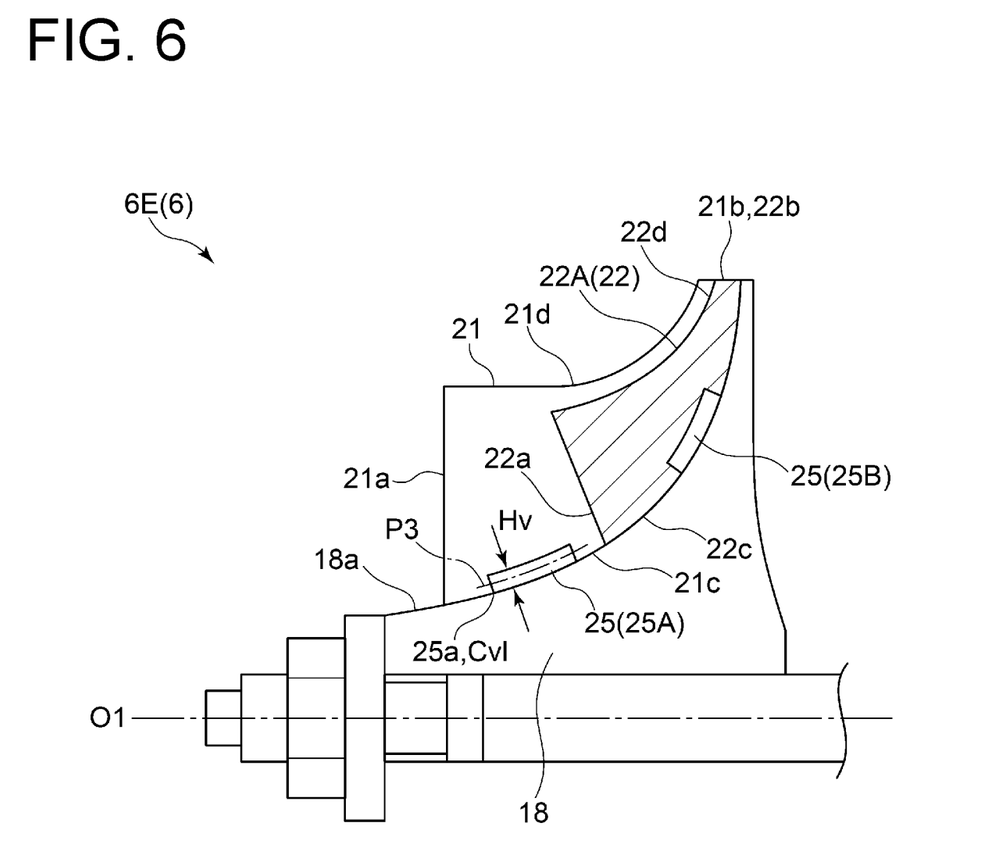
FIG. 6 is a partial cross-sectional view showing an example of the centrifugal compressor and the centrifugal compressor impeller according to the second embodiment of the present disclosure.

The impeller 6 (6E) of the centrifugal compressor 5 of the turbocharger 1 according to the present embodiment includes, as shown in FIG. 6 (FIG. 1), a hub 18, a plurality of full blades 21 disposed on the peripheral surface 18a of the hub 18 at intervals in the circumferential direction, and a plurality of splitter blades 22 each of which is disposed between adjacent full blades 21 of the plurality of full blades 21 on the peripheral surface 18a of the hub 18.

Here, the impeller 6 (6E) of the centrifugal compressor 5 of the present embodiment may include any of the splitter blades 22 described in the first embodiment (including modifications of the first embodiment) as the splitter blade 22, although there is no particular limitation.

In addition to this, the impeller 6 (6E) of the centrifugal compressor 5 of the present embodiment further includes a plurality of protrusions 25 (e.g., vortex generator VG) configured to protrude from the peripheral surface 18a of the hub 18, at least one protrusion being disposed between each adjacent full blades 21 (first full blade 21A and second full blade 21B).

Figure 7:
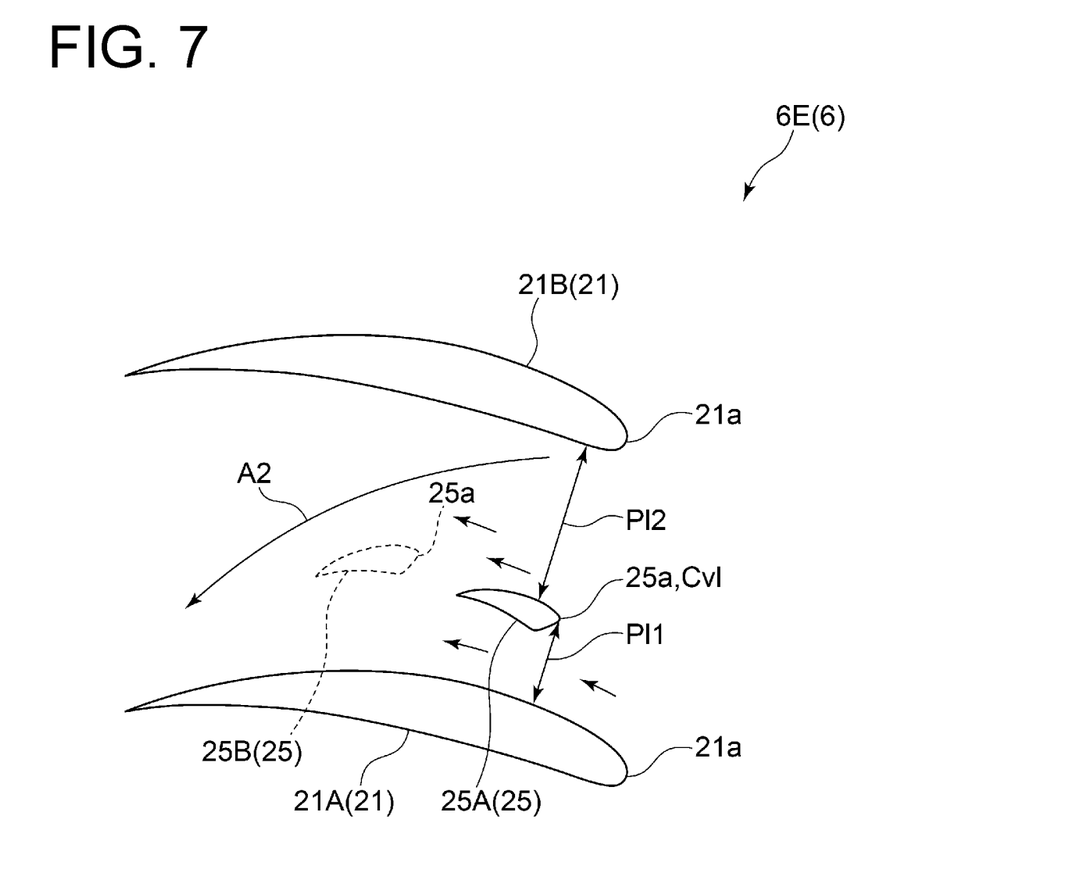
FIG. 7 is a partial plan view showing the centrifugal compressor and rotor blades and protrusions of the centrifugal compressor impeller according to the second embodiment of the present disclosure.

The protrusion 25 is provided such that, as shown in FIGS. 6 and 7 (see FIG. 9), with respect to the chord position along the chord direction of the full blade 21 on the meridional plane of the impeller 6 (6E), when the chord position at the leading edge 21a of the full blade 21 is defined as 0%, the chord position at the trailing edge 21b of the full blade 21 is defined as 100%, and the chord position at the upstream edge 25a of the protrusion 25 is defined as Cv1, Cv1≤50% is satisfied, and when a blade height of the full blade 21 is defined as Hf, and a height of the protrusion 25 on the meridional plane is defined as Hv, Hv≤0.3×Hf is satisfied.

As in the first embodiment, the blade height Hf of the full blade 21 and the height Hv of the protrusion 25 in the present disclosure are each a length dimension from the base end 21c, 25c to the tip end 21d, 25 in the direction perpendicular to the center line P1, P3 between the base end 21c, 25c and the tip end 21d, 25d, in the meridional plane of the impeller 6.

When the protrusion 25 is provided, the protrusion 25 with a small height directs the flow along the peripheral surface 18a of the hub 18 toward the blade surface of the full blade 21 (or splitter blade 22) to the direction along the blade surface on the peripheral surface 18a of the hub 18, i.e., toward the trailing edge 21b of the full blade 21 to create a flow toward the trailing edge 21b of the full blade 21 more smoothly than the conventional flow. As a result, the flow running up the blade surface of the full blade 21 (or splitter blade 22) is less likely to occur, and it is possible to further suppress the generation of the secondary flow A3.

Thus, with the impeller 6 of the centrifugal compressor 5 and the centrifugal compressor 5 including the same according to the present embodiment, it is possible to suppress the generation of the secondary flow A3 and suppress interference with the leakage flow more greatly, achieve uniform flow distribution, high pressure ratio, and high efficiency compared to conventional ones still more efficiently and effectively, and further improve the impeller efficiency, than in the first embodiment.

Here, in the impeller 6 of the centrifugal compressor 5 according to the present embodiment, the upstream edge 25a of the protrusion 25 is preferably disposed upstream of the leading edge 22a of the splitter blade 22.

With this configuration, the protrusion 25 with a small height directs the flow along the peripheral surface 18a of the hub 18 toward the blade surface of the full blade 21 (or splitter blade 22) more effectively to the direction along the blade surface to create a more smooth and organized flow than the conventional flow. Thus, it is possible to further suppress the generation of the secondary flow A3.

The centrifugal compressor impeller and the centrifugal compressor including the same according to the first and second embodiments of the present disclosure has been described above. However, the centrifugal compressor impeller and the centrifugal compressor of the present disclosure are not limited to the first and second embodiments, and various modifications can be applied as long as they do not depart from the scope of the present disclosure.

For example, in the second embodiment, the impeller 6 of the centrifugal compressor 5 includes the protrusions 25 in addition to the splitter blades 22 of the first embodiment, but the impeller 6 may not include the splitter blades 22 but include the plurality of protrusions 25 configured to protrude from the peripheral surface 18a of the hub 18, at least one protrusion 25 being disposed between each adjacent full blades 21.

In this configuration, it is preferably configured such that, with respect to the chord position along the chord direction of the full blade 21 on the meridional plane of the impeller 6, when the chord position at the leading edge 21a of the full blade 21 is defined as 0%, the chord position at the trailing edge 21b of the full blade 21 is defined as 100%, and the chord position at the upstream edge 25a of the protrusion 25 is defined as Cv1, Cv1≤50% is satisfied, and when a blade height of the full blade 21 is defined as Hf, and a height of the protrusion 25 on the meridional plane is defined as Hv, Hv≤0.3×Hf is satisfied.

In this case, the protrusion 25 directs the flow along the peripheral surface 18a of the hub 18 toward the blade surface of the full blade 21 effectively to the direction along the blade surface to create a more smooth flow than the conventional flow. As a result, the flow running up the blade surface of the full blade 21 is less likely to occur, and it is possible to further suppress the generation of the secondary flow A3. Additionally, it is possible to suppress interference with the leakage flow, achieve uniform flow distribution, high pressure ratio, and high efficiency compared to conventional ones efficiently and effectively, and further improve the impeller efficiency.

Further, as shown in FIG. 7, it may be configured such that, when a pitch distance along the circumferential direction between the upstream edge 25a of the protrusion 25 and the suction surface of a first full blade 21A which is one of the adjacent full blades 21 is defined as $P1_1$, and a pitch distance along the circumferential direction between the upstream edge 25a of the protrusion 25 and the pressure surface of a second full blade 21B which is the other of the adjacent full blades 21 is defined as $P1_2$, $P1_1 < P1_2$ is satisfied.

In this case, the protrusion 25 directs the flow A2 toward the suction surface of the first full blade 21A more efficiently and effectively to the direction along the blade surface (toward the trailing edge 21b of the first full blade 21A) to create a more smooth and organized flow than the conventional flow appropriately.

Further, the at least one protrusion 25 disposed between adjacent full blades 21 may include a first protrusion 25A and a second protrusion 25B different from the first protrusion 25A. In other words, two or more protrusions 25 may be disposed between the blades.

In this case, each protrusion 25, the first protrusion 25A and the second protrusion 25B, directs the flow A2 along the peripheral surface 18a of the hub 18 toward the blade surface of the full blade 21 (or splitter blade 22) to the direction along the blade surface to create a more organized flow than the conventional flow more effectively. As a result, the flow running up the blade surface of the full blade 21 (or splitter blade 22) is even less likely to occur, and it is possible to further suppress the generation of the secondary flow A3.

Further, in this case, the upstream edge 25a of the first protrusion 25A is preferably disposed upstream of the upstream edge 25a of the second protrusion 25B. In other words, it is preferable that the two or more protrusions 25 (25A, 25B) are arranged at different positions in the flow direction.

In this case, each protrusion 25 (25A, 25B) directs the flow A2 toward the blade surface more effectively to the direction along the blade surface to create a more organized flow than the conventional flow.

Further, the upstream edge 25a of the first protrusion 25A is preferably disposed closer to the suction surface of the first full blade 21A than the upstream edge 25a of the second protrusion 25B. In other words, it is preferable that the plurality of protrusions 25 (25A, 25B) between blades are arranged in multiple rows in the flow direction.

In this case, each protrusion 25 (25A, 25B) directs the flow A3 along the peripheral surface 18a of the hub 18 toward the blade surface of the full blade 21 (or splitter blade 22) still more effectively to the direction along the blade surface to create a more organized flow than the conventional flow.

Finally, the contents described in the above embodiments (including modifications) would be understood as follows, for instance.

(1) An impeller (impeller 6, 6A to 6D) of a centrifugal compressor (centrifugal compressor 5) according to an aspect includes: a hub (hub 18); a plurality of full blades (full blades 21) disposed on a peripheral surface (peripheral surface 18a) of the hub at intervals in a circumferential direction; and a plurality of splitter blades (splitter blades 22, 22A to 22D) each of which is disposed between adjacent full blades of the plurality of full blades on the peripheral surface of the hub. When a blade height ratio which is a ratio of a blade height (Hf) of each full blade to a blade height (Hs) of each splitter blade on a meridional plane of the impeller is defined as Hs/Hf, the blade height ratio satisfies Hs/Hf<1 at least at a leading edge of each splitter blade.

In this case, the splitter blade with a smaller blade height than the full blade blocks the flow along the peripheral surface of the hub toward the blade surface of the full blade. Thus, it is possible to suppress the generation of the secondary flow by the splitter blade.

Further, when the blade height ratio satisfies Hs/Hf<1 at least at the leading edge of the splitter blade, it is possible to effectively suppress interference with the leakage flow leaking through the gap on the tip end side of the full blade.

Accordingly, it is possible to suppress the generation of the secondary flow and suppress interference with the leakage flow, achieve uniform flow distribution, high pressure ratio, and high efficiency compared to conventional ones more efficiently and effectively, and further improve the impeller efficiency.

(2) An impeller of a centrifugal compressor according to another aspect is the impeller described in the above (1) in which the blade height ratio satisfies Hs/Hf<1 in the entire section from the leading edge (leading edge 22a) to a trailing edge (trailing edge 22b) of each splitter blade.

In this case, since the splitter blade with a smaller blade height than the full blade is provided over a wide range, it is possible to suppress the generation of the flow running up the blade surface of the full blade and thus the generation of the secondary flow by the splitter blade, while suppressing interference with the leakage flow, over the entire operating range (wide range) indicated by the relationship between the flow rate and the pressure ratio of the centrifugal compressor.

(3) An impeller of a centrifugal compressor according to another aspect is the impeller described in the above (2) in which the blade height ratio satisfies Hs/Hf≤0.7 in the entire section from the leading edge to a trailing edge of each splitter blade.

In this case, on the basis of results of diligent research (findings on the position of separation line) by the present inventors, Hs/Hf≤0.7 is satisfied, so that it is possible to suppress interference with the leakage flow leaking through the gap at the tip end of the full blade, while suppressing the generation of the secondary flow, more effectively.

(4) An impeller of a centrifugal compressor according to another aspect is the impeller described in the above (1) in which the blade height ratio satisfies Hs/Hf≤0.7 at least at the leading edge of each splitter blade.

In this case, on the basis of results of diligent research (findings on the position of separation line) by the present inventors, Hs/Hf≤0.7 is satisfied at least at the leading edge of the splitter blade, so that it is possible to suppress interference with the leakage flow leaking through the gap at the tip end of the full blade, while suppressing the generation of the secondary flow, more effectively.

(5) An impeller of a centrifugal compressor according to another aspect is the impeller described in the above (4) in which the blade height ratio is configured to gradually increase from the leading edge to a trailing edge of each splitter blade.

In this case, for example, by forming the splitter blade in accordance with the separation line, it is possible to suppress the generation of the secondary flow and suppress interference with the leakage flow leaking through the gap on the tip end side of the full blade more effectively and efficiently.

(6) An impeller of a centrifugal compressor according to an aspect includes: a hub; a plurality of full blades disposed on a peripheral surface of the hub at intervals in a circumferential direction; and a plurality of splitter blades each of which is disposed between adjacent full blades of the plurality of full blades on the peripheral surface of the hub. With respect to a chord position along a chord direction of each full blade on a meridional plane of the impeller, when the chord position at a leading edge of each full blade is defined as 0%, the chord position at a trailing edge of each full blade is defined as 100%, the chord position at a base end of a leading edge of each splitter blade is defined as Ch, and the chord position at a tip end of the leading edge of each splitter blade is defined as Ct, Ch≤30% and Ct≥50% are satisfied.

With this configuration, the splitter blade can be formed in accordance with the position of the separation line where the secondary flow may be generated, so that it is possible to suppress the generation of the secondary flow and suppress interference with the leakage flow leaking through the gap on the tip end side of the full blade effectively and efficiently.

(7) An impeller of a centrifugal compressor according to another aspect is the impeller described in the above (6) in which, when a chord length at the base end of each splitter blade is defined as Lh, and a chord length at the tip end of each splitter blade is defined as Lt, $2 \times Lt \leq Lh$ is satisfied.

In this case, similarly, on the basis of findings obtained as a result of diligent research by the present inventors, the splitter blade can be formed in accordance with the position of the separation line where the secondary flow may be generated, so that it is possible to suppress the generation of the secondary flow and suppress interference with the leakage flow leaking through the gap on the tip end side of the full blade effectively and efficiently.

(8) An impeller of a centrifugal compressor according to another aspect is the impeller described in the above (6) or (7) in which the leading edge of each splitter blade has a curved surface shape that is concave with respect to a straight line connecting the base end (base end 22c) and the tip end (tip end 22d) of the leading edge on the meridional plane.

In this case, on the basis of findings obtained as a result of diligent research by the present inventors, the splitter blade can be formed in accordance with the concavely curved separation line (concavely curved surface) where the secondary flow may be generated, so that it is possible to suppress the generation of the secondary flow and suppress interference with the leakage flow leaking through the gap on the tip end side of the full blade more effectively and efficiently.

(9) An impeller of a centrifugal compressor according to another aspect is the impeller described in any one of the above (6) to (8) in which Ch=0% is satisfied.

In this case, it is possible to block the flow along the peripheral surface of the hub toward the blade surface of the full blade from the leading edge side of the full blade, and suppress the generation of the secondary flow by the splitter blade still more effectively.

(10) An impeller (impeller 6, 6E) of a centrifugal compressor according to another aspect is the impeller described in any one of the above (1) to (9) further including a plurality of protrusions (protrusions 25) configured to protrude from the peripheral surface of the hub, at least one protrusion being disposed between each adjacent full blades, With respect to a chord position along a chord direction of each full blade on a meridional plane of the impeller, when the chord position at a leading edge of each full blade is defined as 0%, the chord position at a trailing edge of each full blade is defined as 100%, and the chord position at an upstream edge (upstream edge 25a) of each protrusion is defined as Cv1, $Cv1 \leq 50\%$ is satisfied. When a blade height of each full blade is defined as Hf, and a height of each protrusion on the meridional plane is defined as Hv, $Hv \leq 0.3 \times Hf$ is satisfied.

In this case, the protrusion with a small height directs the flow along the peripheral surface of the hub toward the blade surface of the full blade (or splitter blade) to the direction along the blade surface on the peripheral surface of the hub, i.e., toward the trailing edge of the full blade to create a flow toward the trailing edge of the full blade more smoothly than the conventional flow. As a result, the flow running up the blade surface of the full blade (or splitter blade) is less likely to occur, and it is possible to further suppress the generation of the secondary flow.

Accordingly, it is possible to more greatly suppress the generation of the secondary flow and suppress interference with the leakage flow, achieve uniform flow distribution, high pressure ratio, and high efficiency compared to conventional ones still more efficiently and effectively, and further improve the impeller efficiency.

(11) An impeller of a centrifugal compressor according to another aspect is the impeller described in the above (10) in which the upstream edge of each protrusion is disposed upstream of the leading edge of each splitter blade.

With this configuration, the protrusion with a small height directs the flow along the peripheral surface of the hub toward the blade surface of the full blade (or splitter blade) more effectively to the direction along the blade surface to create a more smooth and organized flow than the conventional flow. Thus, it is possible to further suppress the generation of the secondary flow.

(12) An impeller of a centrifugal compressor according to an aspect includes: a hub; a plurality of full blades disposed on a peripheral surface of the hub at intervals in a circumferential direction; and a plurality of protrusions configured to protrude from the peripheral surface of the hub, at least one protrusion being disposed between each adjacent full blades. With respect to a chord position along a chord direction of each full blade on a meridional plane of the impeller, when the chord position at a leading edge of each full blade is defined as 0%, the chord position at a trailing edge of each full blade is defined as 100%, and the chord position at an upstream edge of each protrusion is defined as Cv1, $Cv1 \leq 50\%$ is satisfied. When a blade height of each full blade is defined as Hf, and a height of each protrusion on the meridional plane is defined as Hv, $Hv \leq 0.3 \times Hf$ is satisfied.

In this case, the protrusion directs the flow along the peripheral surface of the hub toward the blade surface of the full blade effectively to the direction along the blade surface to create a more smooth flow than the conventional flow. As a result, the flow running up the blade surface of the full blade is less likely to occur, and it is possible to further suppress the generation of the secondary flow. Additionally, it is possible to suppress interference with the leakage flow, achieve uniform flow distribution, high pressure ratio, and high efficiency compared to conventional ones efficiently and effectively, and further improve the impeller efficiency.

Accordingly, it is possible to more greatly suppress the generation of the secondary flow and suppress interference with the leakage flow, achieve uniform flow distribution, high pressure ratio, and high efficiency compared to conventional ones efficiently and effectively, and further improve the impeller efficiency.

(13) An impeller of a centrifugal compressor according to another aspect is the impeller described in the above (12) in which, when a pitch distance along the circumferential direction between the upstream edge of each protrusion and a suction surface of a first full blade (first full blade 21A) which is one of the adjacent full blades is defined as $P1_1$, and a pitch distance along the circumferential direction between the upstream edge of each protrusion and a pressure surface of a second full blade (second full blade 21B) which is the other of the adjacent full blades is defined as $P1_2$, $P1_1 < P1_2$ is satisfied.

In this case, the protrusion directs the flow toward the suction surface of the first full blade more efficiently and effectively to the direction along the blade surface (toward the trailing edge of the first full blade) to appropriately create a more smooth and organized flow than the conventional flow.

(14) An impeller of a centrifugal compressor according to another aspect is the impeller described in the above (13) in which the at least one protrusion disposed between the adjacent full blades includes a first protrusion (first protrusion 25A) and a second protrusion (second protrusion 25B) different from the first protrusion.

In this case, each protrusion, the first protrusion and the second protrusion, directs the flow along the peripheral surface of the hub toward the blade surface of the full blade (or splitter blade) to the direction along the blade surface to create a more organized flow than the conventional flow more effectively. As a result, the flow running up the blade surface of the full blade (or splitter blade) is even less likely to occur, and it is possible to further suppress the generation of the secondary flow.

(15) An impeller of a centrifugal compressor according to another aspect is the impeller described in the above (14) in which an upstream edge of the first protrusion is disposed upstream of an upstream edge of the second protrusion.

In this case, each protrusion directs the flow toward the blade surface more effectively to the direction along the blade surface to create a more organized flow than the conventional flow.

(16) An impeller of a centrifugal compressor according to another aspect is the impeller described in the above (14) or (15) in which an upstream edge of the first protrusion is disposed closer to the suction surface of the first full blade than an upstream edge of the second protrusion.

In this case, each protrusion directs the flow along the peripheral surface of the hub toward the blade surface of the full blade still more effectively to the direction along the blade surface to create a more organized flow than the conventional flow.

(17) A centrifugal compressor according to an aspect includes the impeller described in any one of the above (1) to (16).

With the centrifugal compressor described in the above (17), it is possible to obtain the effects of the impeller described in any one of the above (1) to (16).

REFERENCE SIGNS LIST

1 Turbocharger
2 Turbine
4 Rotational shaft
5 Centrifugal compressor (Compressor)
6 Impeller
6A to 6E Impeller
18 Hub
18a Peripheral surface
21 Full blade (Rotor blade)
21A First full blade
21B Second full blade
21a Leading edge
21b Trailing edge
21c Base end
21d Tip end
22 Splitter blade (Rotor blade)
22A to 22D Splitter blade
22a Leading edge
22b Trailing edge
22c Base end
22d Tip end
25 Protrusion
25A First protrusion
25B Second protrusion
25a Upstream edge
A Air (Fluid)
A' Compressed air (Compressed fluid, Fluid)
A3 Secondary flow
O1 Axis (Axial direction)

The invention claimed is:

1. An impeller of a centrifugal compressor, comprising:
   a hub;
   a plurality of full blades disposed on a peripheral surface of the hub at intervals in a circumferential direction; and
   a plurality of splitter blades each of which is disposed between adjacent full blades of the plurality of full blades on the peripheral surface of the hub,
   wherein, with respect to a chord position along a chord direction of each full blade on a meridional plane of the impeller,
   when a chord position at a leading edge of each full blade is defined as 0%,
   a chord position at a trailing edge of each full blade is defined as 100%,
   a chord position at a base end of a leading edge of each splitter blade is defined as Ch, and
   a chord position at a tip end of the leading edge of each splitter blade is defined as Ct, Ch≤30% and Ct≥50% are satisfied.

2. The impeller of a centrifugal compressor according to claim 1,
   wherein when a chord length at the base end of each splitter blade is defined as Lh, and
   a chord length at the tip end of each splitter blade is defined as Lt,
   2×Lt≤ Lh is satisfied.

3. The impeller of a centrifugal compressor according to claim 1,
   wherein the leading edge of each splitter blade has a curved surface shape that is concave with respect to a straight line connecting the base end and the tip end of the leading edge on the meridional plane.

4. The impeller of a centrifugal compressor according to claim 1,
   wherein Ch=0% is satisfied.

5. The impeller of a centrifugal compressor according to claim 1
   wherein when a blade height ratio which is a ratio of a blade height (Hf) of each full blade to a blade height (Hs) of each splitter blade on a meridional plane of the impeller is defined as Hs/Hf,
   the blade height ratio satisfies Hs/Hf<1 at least at a leading edge of each splitter blade.

6. The impeller of a centrifugal compressor according to claim 5,
   wherein the blade height ratio satisfies Hs/Hf<1 in an entire section from the leading edge to a trailing edge of each splitter blade.

7. The impeller of a centrifugal compressor according to claim 6
   wherein the blade height ratio satisfies Hs/Hf≤0.7 in the entire section from the leading edge to the trailing edge of each splitter blade.

8. The impeller of a centrifugal compressor according to claim 5,
   wherein the blade height ratio satisfies Hs/Hf≤0.7 in the leading edge of each splitter blade.

9. The impeller of a centrifugal compressor according to claim 8,
   wherein the blade height ratio is configured to gradually increase from the leading edge to a trailing edge of each splitter blade.

10. The impeller of a centrifugal compressor, according to claim 1, further comprising a plurality of protrusions configured to protrude from the peripheral surface of the hub, at least one protrusion being disposed between each adjacent full blades, wherein, with respect to a chord position along a chord direction of each full blade on a meridional plane of the impeller, when the chord position at a leading edge of each full blade is defined as 0%, the chord position at a trailing edge of each full blade is defined as 100%, and the chord position at an upstream edge of each protrusion is defined as Cv1, Cv1≤50% is satisfied, and when a blade height of each full blade is defined as Hf, and a height of each protrusion on the meridional plane is defined as Hv, Hv≤0.3×Hf is satisfied.

11. The impeller of a centrifugal compressor according to claim 10, wherein the upstream edge of each protrusion is disposed upstream of the leading edge of each splitter blade.

12. A centrifugal compressor, comprising the impeller according to claim 11.

* * * * *